(12) United States Patent
Schrieber et al.

(10) Patent No.: US 11,299,004 B2
(45) Date of Patent: Apr. 12, 2022

(54) SWAY BAR LINKAGE ASSEMBLY

(71) Applicant: Federal-Mogul Motorparts LLC, Southfield, MI (US)

(72) Inventors: Dustin Schrieber, Waterloo, IL (US); Steven Douglas Schmitt, Shobonier, IL (US); Glen C. Parker, St. Peters, MO (US); Andrew Louis Auquier, Shelby Township, MI (US)

(73) Assignee: Federal-Mogul Motorparts, LLC, Southfield, MI (US)

( * ) Notice: Subject to any disclaimer, the term of this patent is extended or adjusted under 35 U.S.C. 154(b) by 0 days.

(21) Appl. No.: 17/173,880

(22) Filed: Feb. 11, 2021

(65) Prior Publication Data

US 2021/0309067 A1    Oct. 7, 2021

Related U.S. Application Data

(60) Provisional application No. 63/004,292, filed on Apr. 2, 2020.

(51) Int. Cl.
*B60G 21/055*    (2006.01)

(52) U.S. Cl.
CPC ...... *B60G 21/0551* (2013.01); *B60G 2204/41* (2013.01); *B60G 2204/416* (2013.01); *B60G 2400/98* (2013.01)

(58) Field of Classification Search
CPC . F16F 3/0873; B60G 2204/1224; B60G 7/02; B60G 2400/98; B60G 2204/416; B60G 2204/41; B60G 21/0551
See application file for complete search history.

(56) References Cited

U.S. PATENT DOCUMENTS

| | | | |
|---|---|---|---|
| 4,552,379 A | 11/1985 | Foster | |
| 4,944,523 A * | 7/1990 | Hardy, Jr | B60G 21/0551 280/124.152 |
| 5,449,193 A | 9/1995 | Rivard et al. | |

(Continued)

FOREIGN PATENT DOCUMENTS

| | | | |
|---|---|---|---|
| DE | 102014219605 | 3/2016 | |
| EP | 0636504 A1 * | 2/1995 | ......... B60G 21/0551 |
| JP | 2004224301 | 8/2004 | |

OTHER PUBLICATIONS

International Search Report for International Application PCT/US2021/025443, dated Jul. 12, 2021.

*Primary Examiner* — Paul N Dickson
*Assistant Examiner* — Maxwell L Meshaka
(74) *Attorney, Agent, or Firm* — Burris Law, PLLC

(57) ABSTRACT

A sway bar linkage assembly includes a socket joint, a shank extending from the socket joint, a bolt, and a bushing. The shank has a first bore with a first bore diameter and a second bore extending between the first bore and the socket joint. The second bore has a second bore diameter less than the first bore diameter such that a flange extends between the first bore and the second bore. The bolt has a head, a shaft extending from the head and a stud extending between the shaft is included. The shaft has a first diameter and the stud has second diameter less than the first diameter such that a ledge extends between the shaft and the stud. The bushing is compressed a predefined by the bolt when the bolt extends through the bushing and the ledge of the bolt abuts against the flange of the shank.

20 Claims, 5 Drawing Sheets

(56) References Cited

U.S. PATENT DOCUMENTS

| | | | |
|---|---|---|---|
| 5,551,722 A * | 9/1996 | Schwartz | B60G 7/001 280/124.152 |
| 5,704,631 A * | 1/1998 | Sparks | B60G 21/0551 280/124.101 |
| 5,829,769 A | 11/1998 | Hillqvist | |
| 6,533,301 B1 | 3/2003 | Catania | |
| 7,354,054 B2 | 4/2008 | Pazdirek | |
| 10,017,026 B2 | 7/2018 | Harvey | |
| 2018/0038438 A1* | 2/2018 | Shinkawa | F16F 3/12 |
| 2018/0312027 A1 | 11/2018 | Harvey | |
| 2020/0398626 A1* | 12/2020 | Sugg | B60G 21/0551 |

* cited by examiner

ID ASSEMBLY

CROSS-REFERENCE TO RELATED APPLICATIONS

This application claims priority to and the benefit of U.S. Provisional Application No. 63/004,292 filed on Apr. 2, 2020. The disclosure of the above application is incorporated herein by reference.

FIELD

The present disclosure relates to linkage assemblies and particularly to sway bar linkage assemblies.

BACKGROUND

The statements in this section merely provide background information related to the present disclosure and may not constitute prior art. α

A vehicle suspension system typically includes a sway bar for limiting "roll" of the vehicle when turning. Such sway bars include a bar or tube that extends laterally across the vehicle and has ends that are connected to a left wheel assembly and a right wheel assembly through a pair of sway bar linkage assemblies.

Installation of a sway bar onto a new vehicle, replacement of sway bar and/or replacement of a sway bar linkage assembly includes an operator or technician aligning of an end of the sway bar and two or more components of the sway bar linkage assembly such that a bolt can be fed through holes or apertures of sway bar end and the components in order couple the sway bar end to the sway bar linkage assembly.

The present disclosure addresses the issues of installing or replacing a sway linkage assembly and other issues related to sway bar linkage assemblies.

SUMMARY

This section provides a general summary of the disclosure and is not a comprehensive disclosure of its full scope or all of its features.

In one form of the present disclosure, a sway bar linkage assembly includes a socket joint with a shank rigidly attached to and extending from the socket joint, a bolt, and at least one bushing. The shank has a bushing end spaced apart from the socket joint, a first bore extending between the bushing end and the socket joint and a second bore extending between the first bore and the socket joint. The first bore has a first bore diameter and the second bore has a second bore diameter less than the first bore diameter such that a flange extends between the first bore and the second bore. The bolt has a head, a shaft extending from the head and a stud extending from the shaft. The shaft has a first diameter and the stud has second diameter less than the first diameter such that a ledge extends between the shaft and the stud. The at least one bushing is configured to be disposed on the bolt and compressed a predefined amount between the head of the bolt and the bushing end of the shank when the bolt is disposed within and extends through the at least one bushing and the ledge of the bolt abuts against the flange of the shank.

In some variations, the shaft comprises a length configured to compress the at least one bushing the predefined amount when the stud of the bolt mechanically engages the second bore of the shank such that the ledge of the bolt abuts against the flange of the shank.

In at least one variation, the ledge defines a ledge angle relative to a bore axis between about 45° and about 90° and the flange defines a flange angle relative to a shank axis and the flange angle is complimentary to the ledge angle when the bore axis is aligned with the shank axis.

In some variations, the ledge defines a ledge angle relative to the bore axis of about 90° and the flange defines a flange angle relative to the shank axis of about 90° when the second shaft of the bolt is disposed within the second bore of the shank.

In at least one variation, the at least one bushing includes a first bushing and a second bushing, the first bushing is disposed on the bolt proximal to the head of the bolt and the second bushing is disposed on the bolt between the first bushing and the socket joint. In such variations, the bolt is configured to compress the first bushing and the second bushing a predefined amount between the head of the bolt and the bushing end of the shank when the bolt is disposed within and extends through the first and second bushings and an outer engagement surface of the bolt mechanically engages an inner engagement surface of the shank such that the flange of the bolt abuts against the ledge of the shank. Also, an end of a sway bar can be disposed on the bolt between the first bushing and the second bushing, and a washer can be disposed on the bolt between the head and an inset surface of first bushing.

In some variations, the shaft has a length configured to compress the first and second bushing the predefined amount when the outer engagement surface of the bolt mechanically engages the inner engagement surface of the shank such that the flange of the bolt abuts against the ledge of the shank.

In at least one variation the second bushing has an inset surface disposed directly on the bushing end of the shank and in some variations, the shaft is nested within the first bore.

In at least one variation a ball stud is disposed within the socket joint.

In some variations, a sway bar and a control arm are included and the socket joint, shank, bolt, and at least one bushing mechanically connect or couple the sway bar to the control arm.

In at least one variation, the stud of the bolt has an inner engagement surface in the form of an internal threaded surface or an internal bayonet joint surface, the second bore has an outer engagement surface in the form of an external threaded surface or an external bayonet joint surface, and the inner engagement surface is complimentary with the outer engagement surface.

In another form of the present disclosure, a sway bar linkage assembly includes a socket joint with a housing and a ball stud disposed within and extending from the housing, a shank extending between a socket joint end and a bushing end, a bolt, a first bushing and a second bushing. The shank has first bore extending between the bushing end and the socket joint end, and a second bore extending between the first bore and the socket joint end. Also, the first bore has a first bore diameter and the second bore has inner threads and a second bore diameter less than the first bore diameter such that a flange extends between the first bore and the second bore. The bolt has head, a shaft extending from the head, and a stud extending from the shaft. Also, the shaft has a first diameter and the stud has outer threads complimentary with the inner threads of the second bore and a second diameter less than the first diameter such that a ledge extends between the shaft and the stud. The first bushing is positioned proximal to the head of the bolt and the second bushing is positioned between the first bushing and the socket joint. A length of the shaft of the bolt, a length of the first bushing, and a length of the second bushing are configured to compress each of the first bushing and the second bushing a predefined amount between the head of the bolt and the bushing end of the shank when the stud threadingly engages the second bore and the flange of the bolt abuts against the ledge of the shank.

In some variations, the ledge extends between the shaft and the stud at a ledge angle relative to a bolt axis and the flange extends between the first bore and the second bore at a flange angle complimentary to the ledge angle. And in at least one variation, the second bushing comprises an inset surface disposed directly on the bushing end of the shank.

In still another form of the present disclosure, a sway bar linkage assembly includes a socket joint with a housing and a ball stud disposed within and extending from the housing, a shank extending between a socket joint end rigidly attached to the socket joint and a bushing end spaced apart from the socket joint end, a bolt with a head, a shaft extending from the head and a stud extending from shaft, and a first bushing and a second bushing disposed on the bolt. The shank has a first bore extending between the bushing end and the socket joint end, and a second bore extending between the first bore and the socket joint end. The first bore has a first bore diameter, and the second bore has inner threads and a second bore diameter less than the first bore diameter such that a flange extends between the first bore and the second bore. The shaft of the bolt has a first diameter and the stud has outer threads complimentary with the inner threads of the second bore and a second diameter less than the first diameter such that a ledge extends between the shaft and the stud. The first bushing is positioned proximal to the head of the bolt and the second bushing is positioned between the first bushing and the socket joint. A length of the shaft of the bolt, a length of the first bushing, and a length of the second bushing are configured to compress the first bushing and the second bushing a predefined amount between the head of the bolt and the bushing end of the shank when a sway bar end with a predefined thickness is disposed on the bolt between the first bushing and the second bushing and the stud threadingly engages the second bore such that the ledge of the bolt abuts against the flange of the shank.

In some variations, the flange extends between the first bore and the second bore at a ledge angle between about 45° and about 90° relative to a bore axis, and the ledge extends between the shaft and the stud at a ledge angle complimentary to the ledge angle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
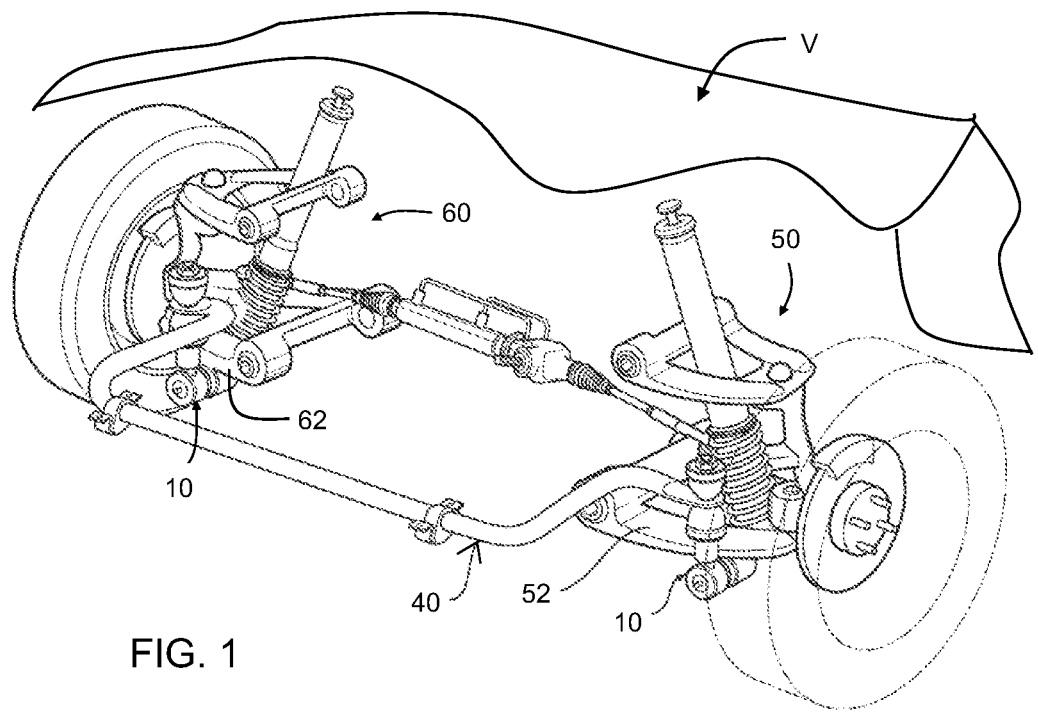
FIG. 1 is a perspective view of a sway bar connected to a pair of wheel assemblies according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components and devices to provide a thorough understanding of variations of the present disclosure. It will be apparent to those skilled in the art that specific details need not be employed and that the examples provided herein, may include alternative forms or variations and are not intended to limit the scope of the disclosure. In some examples, well-known processes, well-known device structures, and well-known technologies are not described in detail.

Referring to FIG. 1, a sway bar 40 connected or coupled to a left wheel assembly 50 and right wheel assembly 60 of a vehicle 'V' is shown. The sway bar 40 has a pair of oppositely disposed sway bar ends 42 and each sway bar end 42 is coupled between a pair of bushings 120 (FIG. 2) of a respective sway bar linkage assembly 10. Also, the sway bar linkage assemblies 10 are attached to a left control arm 52 and a right control arm 62 of the first and second wheel assemblies 50, 60, respectively. In some variations, the sway bar linkage assembly 10 is non-directional such that a given sway bar linkage assembly 10 can be used to assembly or mount a sway bar end 42 to the left wheel assembly 50 or the right wheel assembly 60.

Figure 2:
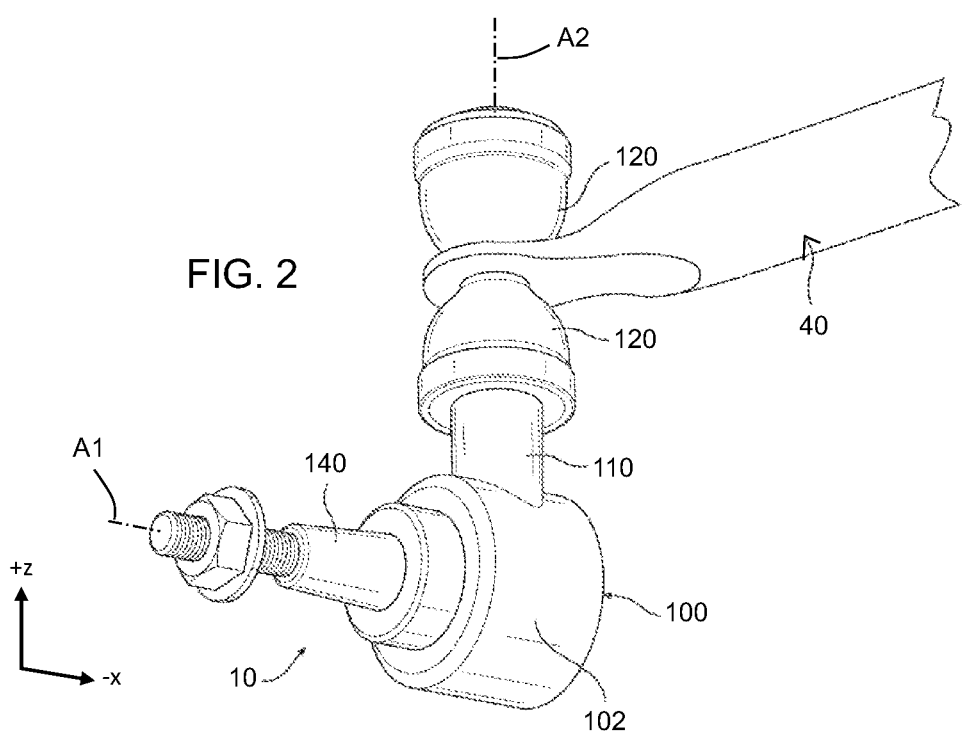
FIG. 2 is a perspective view of a sway bar linkage assembly according to one form of the present disclosure.
Figure 3:
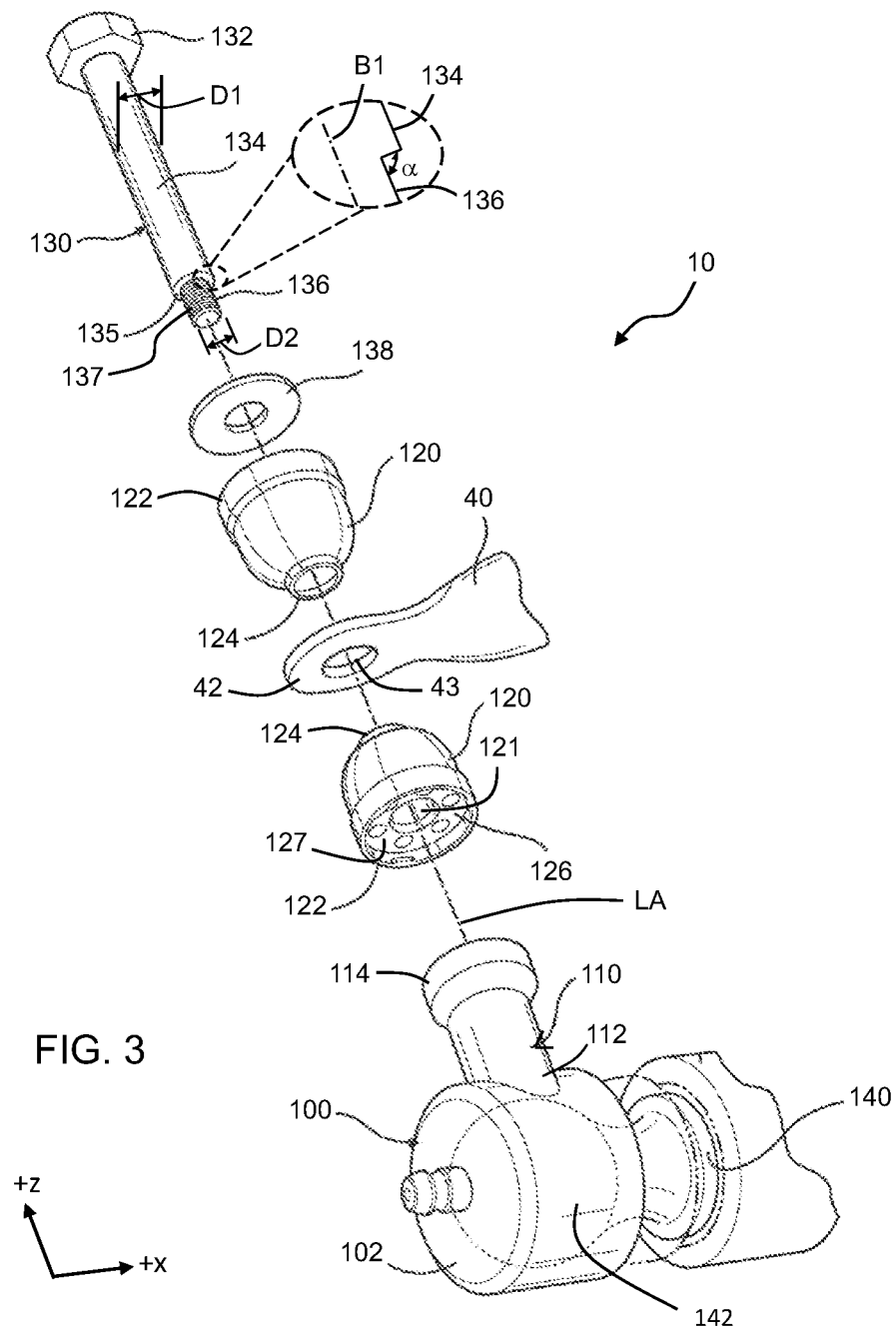
FIG. 3 is an exploded view of the sway bar linkage assembly in FIG. 2.

Referring to FIGS. 2 and 3, a perspective view and an exploded view, respectively, of the sway bar linkage assembly 10 according to one form of the present disclosure is shown. The sway bar linkage assembly 10 includes a socket joint 100 with a housing 102, a shank 110 rigidly attached to and extending from the housing 102, a pair of bushings 120, and a bolt 130. The socket joint 100 is configured for a head 142 of a stud 140 to be disposed within the housing 102 such that the socket joint 100 and the sway bar linkage assembly 10 are securely coupled to a respective control arm 52, 62 (FIG. 1).

The shank 110 has a socket joint end 112 (also referred to herein as a "housing end 112") and a bushing end 114 spaced apart from the housing end 112 and extending along a shank axis 'A1'. In some variations the shank axis A1 is perpendicular to a socket joint axis 'A2." Also, the housing end 112 of the shank 110 is rigidly attached to the housing 102.

In some variations the housing 102 and the shank 110 are formed from a single piece of material, e.g., from a casting, while in other variations the housing 102 and the shank 110 are formed from two separate pieces of material that are joined together, e.g., by welding and/or a threaded engagement. Non-limiting examples of materials that the housing 102 and the shank 110 are formed from include cast iron, steel, and stainless steel, among others.

Figure 4:
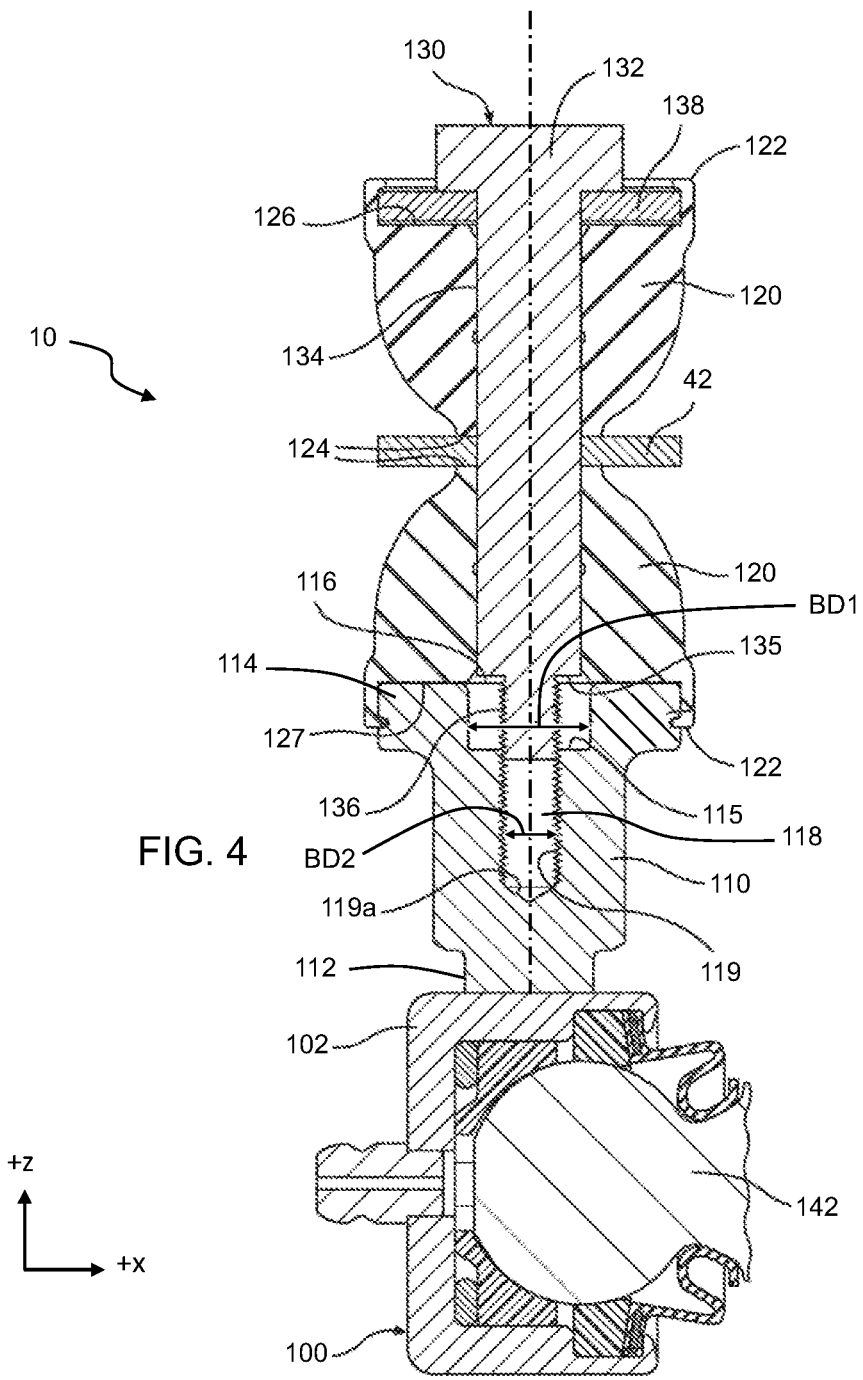
FIG. 4 is a cross-sectional view of the sway bar linkage assembly in FIG. 2 during installation of a sway bar onto a vehicle wheel assembly.

The pair of bushings 120 each have a bolt aperture 121 and the sway bar end 42 has a predefined thickness (z direction) and an aperture 43 such that the bolt 130 extends through the pair of bushings 120 and the sway bar end 42. In this manner or configuration the sway bar 40 is coupled to the shank 110 and the sway bar linkage assembly 10 as shown in FIG. 2. In some variations the pair of bushings 120 are identical in shape and/or size, while in other variations the pair of bushings 120 have a different shape and/or size. In at least one variation, each of the pair of bushings 120 has a bell shape with a first end 122 having a first diameter (not labeled) and a second end 124 having a second diameter (not labeled) less than the first diameter. In some variations, one or both of the bushings 120 include a counter bore 126 extending from the first end 122 towards the second end 124 with an inset surface 127 spaced apart from the first end 122. In such variations, the first end 122 is configured to fit over the bushing end 114 of the shank and/or accept a washer 138 as shown in FIGS. 3 and 4. For example, the pair of bushings 120 can include a first bushing 120 disposed on the bolt 130 proximal to the head 132, a second bushing disposed on the bolt 130 between the first bushing 120 and the socket joint 100. The washer 138 can be disposed on the bolt 130 between the head 132 and the inset surface 127 of the first bushing 120, and the inset surface 127 of the second bushing 120 can be disposed on the bolt 130 in direct contact with the bushing end 114 of the shank 110. Accordingly, a washer is not desired or needed between the shank 110 and the second bushing 120 and the number of parts desired or needed for the sway bar linkage assembly 10 is reduced.

In addition, the pair of bushings 120 are positioned on opposite sides of the sway bar end 42 such that the second end 124 of each bushing 120 is proximal to, and in some variations in contact with, the sway bar end 42. Stated differently, the sway bar linkage assembly 10 is designed or configured for a sway bar end 42 to be positioned between the pair of bushings 120 as shown in the figures. Each of the pair of bushings 120 is formed from an elastically deformable material such as but not limited to natural rubber, styrene-butadiene rubber (SBR), butyl, nitrile, neoprene, ethylene propylene diene monomer (EPDM), silicone, fluoroelastomers such as Viton®, polyurethane, and hydrogenated nitrile, among others.

The bolt 130 has a head 132 with a shaft 134 extending from the head 132, and a stud 136 extending from the shaft 134. The shaft 134 has a predefined length 'L1' and a first diameter 'D1', and the stud 136 has an outer engagement surface 137 and a second diameter 'D2' less than the first diameter D1. Accordingly, a ledge 135 having a ledge angle relative to a bolt axis 'B1' is defined and extends between the first diameter D1 of the shaft 134 and the second diameter D2 of the stud 136. One non-limiting example of the outer engagement surface 137 is a threaded surface as shown in the figures. However, it should be understood that other types of outer engagement surfaces 137 (e.g., a bayonet joint outer surface) are included in the teachings of the present disclosure. In some variations the washer 138 is included and configured to be disposed on the shaft 134 between the head 132 and an outer (+z direction) bushing 120 as shown in FIG. 3. In at least one variation the washer 138 is provided and is attached (e.g., welded or formed integral with) to the head 132. For example, in some variations the washer 136 shown in FIG. 4 is welded to the shaft 134 and/or head 132 of the bolt 130, while in other variations the washer 136 in FIG. 4 is integral with the bolt 130. Non-limiting examples of materials from which the bolt 130 is formed include steels and stainless steels, among others.

Figure 5:
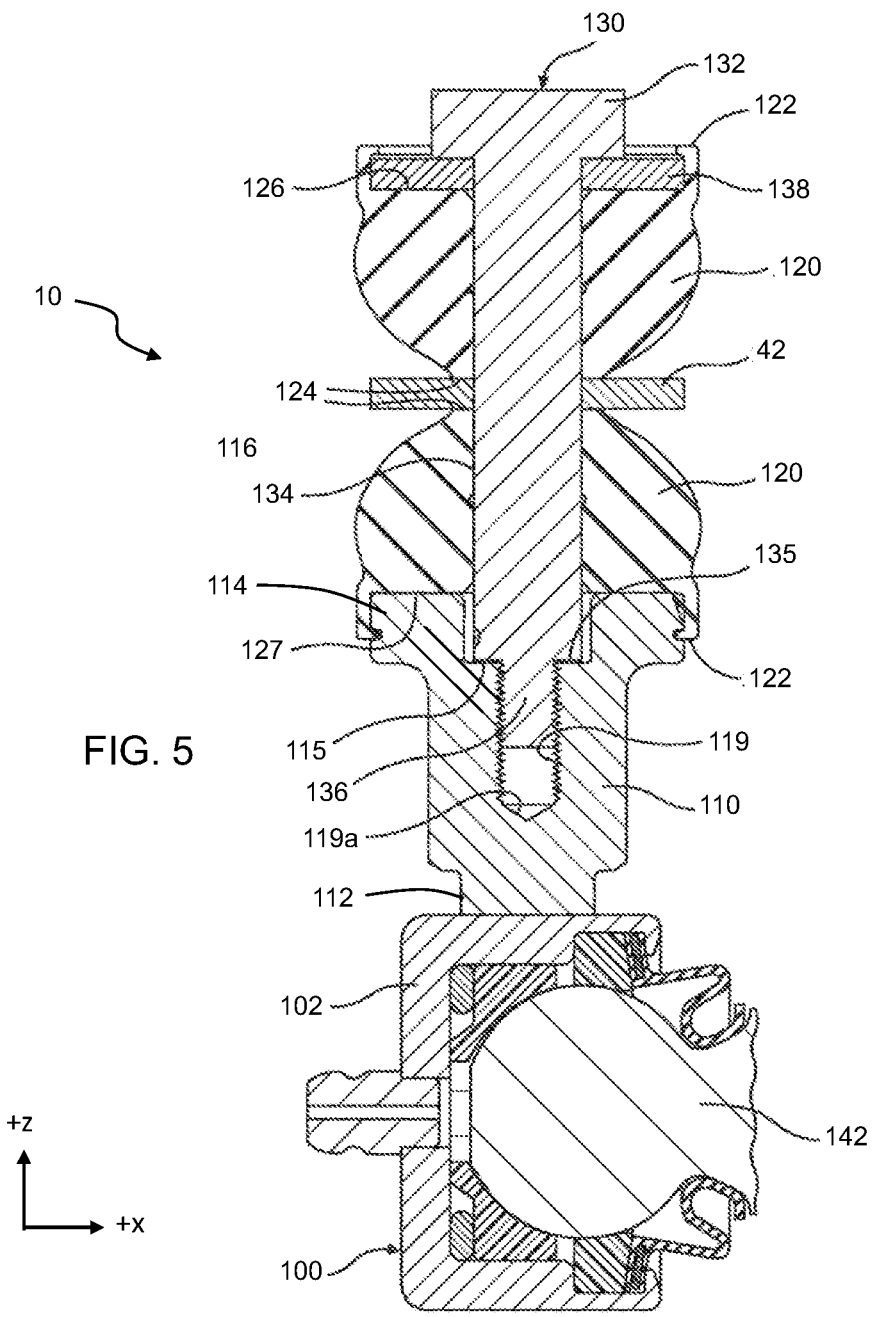
FIG. 5 is a cross-sectional view of the sway bar linkage assembly in FIG. 2 after installation of the sway bar onto the vehicle wheel assembly.

Referring now to FIGS. 4 and 5, a cross-sectional view of the sway bar end 42 and the sway bar linkage assembly 10 before the sway bar 40 is securely attached to the sway bar linkage assembly 10 (e.g., during installation) is shown in FIG. 4 and the same cross-sectional view after the sway bar 40 is securely attached to the sway bar linkage assembly 10 (e.g., after installation) is shown in FIG. 5. As shown in the cross-sectional views, the shank 110 includes a first bore 116 with a first bore diameter 'BD1' extending between the bushing end 114 and the housing end 112 and a second bore 118 with a second bore diameter 'BD2' extending between the first bore 116 and the housing end 112. The second bore diameter BD2 is less than the first bore diameter BD1 such that an abutment flange 115 (also referred to herein simply as "flange 115") is defined and extends between the first bore 116 and the second bore 118. In some variations the first bore 116 has a predefined depth between the bushing end 114 and the second bore 118. The second bore 118 includes an inner engagement surface 119 that is complimentary with the outer engagement surface 137 (FIG. 3) of the stud 136. In some variations the second bore 118 is a "blind hole" with a closed end 119a.

During installation of the sway bar linkage assembly 10, the bolt 130, washer 138 (when included and not welded to or integral with the bolt 130), pair of bushings 120 and sway bar end 42 of the sway bar 40 are aligned along a longitudinal axis 'LA' of the shank 110 as shown in FIG. 3. The bolt 130 is fed through the aperture of the washer 138, the aperture 121 of the outer bushing 120 (+z direction), the aperture 43 of the sway bar end 42, the aperture 121 of the inner bushing 120 (−z direction), and into the first bore 116 of the shank 110 until the stud 136 comes into contact with the second bore 118 of the shank. Also, the outer engagement surface 137 of the stud 136 is engaged with the inner engagement surface 119 of the second bore 118 such that a distal end (−z direction) of the shaft 134 is nested within the first bore 116 of the shank and the ledge 135 of the bolt 130 comes into contact with and abuts against the flange 115 as shown in FIG. 5. For example, and as shown in FIGS. 4 and 5, the outer engagement surface 137 and the inner engagement surface 119 are complimentary male and female threaded surfaces, respectively, and the stud 136 threadingly engages the second bore 118 when the bolt 130 is rotated (screwed). Accordingly, and as the stud 136 is threaded into the second bore 118, the ledge 135 moves towards and eventually abuts against the flange 115 such that the sway bar end 42 (and the sway bar 40) is securely attached to the shank 110 and the socket joint 100. It should be understood that either before or after the sway bar end 42 is securely attached to the shank 110 the socket joint 100 is securely attached to one of the control arms 52, 62.

Still referring to and comparing FIG. 4 to FIG. 5, assembly of the sway bar end 42 to the sway bar linkage assembly 10 compresses (z direction) the pair of bushings 120 such that a desired and predefined compression of the pair of bushings 120 against the sway bar end 42 is provided. That is, the length L1 of the shaft 134 is designed and/or configured such that the pair of bushings 120 are compressed a predetermined amount when the ledge 135 is in direct contact with the flange 115. Accordingly, the sway bar linkage assembly 10 with the sway bar end 42 can be assembled without the use of a torque wrench to tighten the bolt 130 such that a desired amount of torque is applied to the bolt 130 to ensure a desired amount of compression is applied to the pair of bushing 120. In addition, use of a bolt 130 with a different predefine length can be used to assemble a sway bar 40 with a sway bear end having a different thickness (z direction) and/or to assemble the sway bar linkage assembly 10 onto different vehicle models requiring a different compression of the bushings 120. Stated differently, the same socket joint 100, shank 110, and bushings 120 can be used for different vehicle models and/or busing compression specification since bolts 130 with different lengths L1 will result in a different compression of the bushings 120. Accordingly, a reduction in the number of parts needed for different sway bar linkage assembly models is provided by the teachings of the present disclosure.

It should be understood that abutment between the ledge 135 of the bolt 130 and the flange 115 of the shank 110 assists in accommodating bending forces between the sway bar 40 and the socket joint 100. That is, compression, tension and bending forces between the socket joint 100 and the bolt 130 are transferred to and at least partially accommodated by the flange 115 and the ledge 135 rather than the inner engagement surface 119 of the second bore 118 and the outer engagement surface 137 of the stud 136. It should also be understood that transfer of compression, tension and bending forces between the socket joint 100 and the bolt 130 to the flange 115 and the ledge 135 enhances the reliability and structural design or structure of the sway bar linkage assembly 10 and inhibits or reduces stress between the shaft 134 and the stud 136 during use of the sway bar linkage assembly 10.

Figure 6:
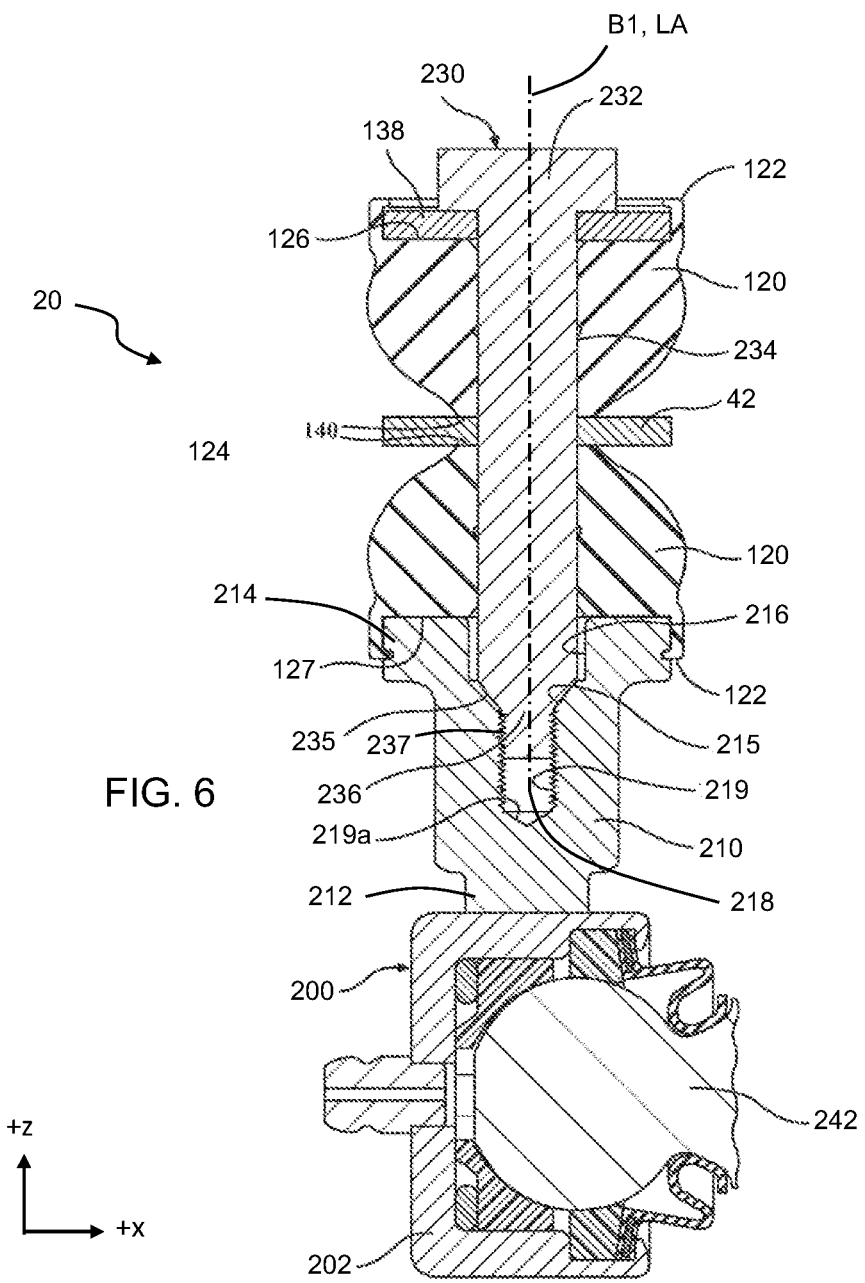
FIG. 6 is a cross-sectional view of a sway bar linkage assembly according to another form of the present disclosure after installation of a sway bar onto a vehicle wheel assembly.

Referring now to FIG. 6, a sway bar linkage assembly 20 according to another form of the present disclosure is shown where similar elements with respect to the sway bar linkage assembly 10 are shown by reference numerals incremented by 100 and the description of which is not included. And as shown with a comparison of FIG. 6 with FIG. 5, the ledge 235 defined between the shaft 234 and the stud 236 is at an incline (i.e., not at a 90° angle as with ledge 135) relative to a longitudinal axis B1 of the bolt 230, and the flange 215 between the first bore 216 and the second bore 218 is complimentary with the ledge 235. Accordingly, it should be understood that the angle and shape of the ledge 235 between the shaft 234 and the stud 236, and the angle and shape of the flange 215 between the first bore 216 and the second bore 218, can be any angle and shape that is complimentary with each other such that the ledge 235 abuts against the flange 215 according to the teachings of the present disclosure. In some variations, the angle of the ledge 235 relative to the longitudinal axis of the bolt 230 is between 90° and 30°, for example, between 90° and 45° or between 90° and 60°.

During installation of the sway bar linkage assembly 20, the bolt 230, washer 138 (when included), pair of bushings 120 and sway bar end 42 of the sway bar 40 are aligned along a longitudinal axis LA of the shank 210 as shown in FIG. 6. The bolt 230 is fed through the aperture of the washer 138, the aperture 121 of the outer bushing 120 (+z direction), the aperture 43 of the sway bar end 42 (FIG. 3), the aperture 121 of the inner bushing 120 (−z direction), and into the first bore 216 of the shank 210 until the stud 236 comes into contact with the second bore 218 of the shank 210. Also, the outer engagement surface 237 of the stud 236 is engaged with the inner engagement surface 219 of the second bore 218 such that a distal end (−z direction) of the shaft 234 is nested within the first bore 216 of the shank 210 and the ledge 235 of the bolt 230 comes into contact with and abuts against the flange 215. For example, the outer engagement surface 237 and the inner engagement surface 219 are complimentary male and female threaded surfaces, respectively, and the stud 236 threadingly engages the second bore 218 when the bolt 230 is rotated (screwed). Accordingly, and as the stud 236 is threaded into the second bore 218, the ledge 235 moves towards and eventually abuts against the flange 215 such that the sway bar end 42 (and the sway bar 40) is securely attached to the shank 210 and the socket joint 200. It should be understood that either before or after the sway bar end 42 is securely attached to the shank 210 the socket joint 200 is securely attached to one of the control arms 52, 62 (FIG. 1).

When an element or layer is referred to as being "on," "mounted on", "disposed on", "disposed in", "engaged to," "connected to", "coupled to," or "attached to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in like fashion (e.g., "between" versus "directly between," "adjacent" versus "directly adjacent," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of" A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A sway bar linkage assembly comprising:
   a socket joint;
   a shank rigidly attached to and extending from the socket joint, the shank comprising a bushing end spaced apart from the socket joint, a first bore extending between the bushing end and the socket joint and a second bore extending between the first bore and the socket joint, wherein the first bore has a first bore diameter and the second bore has a second bore diameter less than the first bore diameter such that a flange extends between the first bore and the second bore;
   a bolt comprising a head, a shaft extending from the head and a stud extending from the shaft, wherein the shaft has a first diameter and the stud has second diameter less than the first diameter such that a ledge extends between the shaft and the stud; and
   at least one bushing configured to be disposed on the bolt and compressed a predefined amount between the head of the bolt and the bushing end of the shank when the bolt is disposed within and extends through the at least one bushing and the ledge of the bolt abuts against the flange of the shank.

2. The sway bar linkage assembly according to claim 1, wherein the shaft comprises a length configured to compress the at least one bushing the predefined amount when the stud of the bolt mechanically engages the second bore of the shank such that the ledge of the bolt abuts against the flange of the shank.

3. The sway bar linkage assembly according to claim 1, wherein the ledge defines a ledge angle between about 45° and about 90° relative to a bore axis.

4. The sway bar linkage assembly according to claim 3, wherein the flange defines a flange angle relative to a bolt axis, the flange angle being complimentary to the ledge angle.

5. The sway bar linkage assembly according to claim 1, wherein the ledge defines a ledge angle of about 90° relative to a bore axis and the flange defines a flange angle relative to the bore axis of about 90° when the stud of the bolt is disposed within the second bore of the shank.

6. The sway bar linkage assembly according to claim 1, wherein the at least one bushing comprises a first bushing and a second bushing, the first bushing is disposed on the bolt proximal to the head of the bolt and the second bushing is disposed on the bolt between the first bushing and the socket joint.

7. The sway bar linkage assembly according to claim 6, wherein the bolt is disposed within and extends through the first bushing and the second bushing, an outer engagement surface of the bolt mechanically engages an inner engagement surface of the shank, the flange of the bolt abuts against the ledge of the shank, and the first bushing and the second bushing are compressed a predefined amount between the head of the bolt and the bushing end of the shank.

8. The sway bar linkage assembly according to claim 7 further comprising a sway bar end disposed on the bolt between the first bushing and the second bushing.

9. The sway bar linkage assembly according to claim 8 further comprising a washer disposed on the bolt between the head and an inset surface of first bushing.

10. The sway bar linkage assembly according to claim 9, wherein the shaft comprises a length configured to compress the first bushing and the second bushing the predefined amount when the outer engagement surface of the bolt mechanically engages the inner engagement surface of the shank such that the ledge of the bolt abuts against the flange of the shank.

11. The sway bar linkage assembly according to claim 10, wherein the second bushing comprises an inset surface disposed directly on the bushing end of the shank.

12. The sway bar linkage assembly according to claim 1, wherein the shaft is nested within the first bore.

13. The sway bar linkage assembly according to claim 1 further comprising a ball stud disposed within the socket joint.

14. The sway bar linkage assembly according to claim 1 further comprising a sway bar and a control arm, wherein the socket joint, shank, bolt, and at least one bushing are disposed between and mechanically connect the sway bar to the control arm.

15. The sway bar linkage assembly according to claim 1, wherein the stud of the bolt comprises an inner engagement surface selected from the group consisting of an internal threaded surface and an internal bayonet joint surface, the second bore comprises an outer engagement surface selected from the group consisting of an external threaded surface and an external bayonet joint surface, and the outer engagement surface is complimentary with the inner engagement surface.

16. A sway bar linkage assembly comprising:
   a socket joint comprising a housing and a ball stud disposed within and extending from the housing;
   a shank extending between a socket joint end and a bushing end, the shank comprising a first bore extending between the bushing end and the socket joint end, and a second bore extending between the first bore and the socket joint end, wherein the first bore has a first bore diameter and the second bore has inner threads and a second bore diameter less than the first bore diameter such that a flange extends between the first bore and the second bore;

a bolt comprising a head, a shaft extending from the head, and a stud extending from the shaft, wherein the shaft has a first diameter and the stud has outer threads complimentary with the inner threads of the second bore and a second diameter less than the first diameter such that a ledge extends between the shaft and the stud; and a first bushing and a second bushing disposed on the bolt, the first bushing positioned proximal to the head of the bolt and the second bushing positioned between the first bushing and the bushing end of the shank, wherein a length of the shaft of the bolt, a length of the first bushing, and a length of the second bushing are configured to compress each of the first bushing and the second bushing a predefined amount between the head of the bolt and the bushing end of the shank when the stud threadingly engages the second bore and the ledge of the bolt abuts against the flange of the shank.

17. The sway bar linkage assembly according to claim 16, wherein the ledge extends between the shaft and the stud at a ledge angle relative to a bolt axis and the flange extends between the first bore and the second bore at a flange angle between about 45° and about 90° relative to a bore axis and complimentary to the ledge angle.

18. The sway bar linkage assembly according to claim 16, wherein the second bushing comprises an inset surface disposed directly on the bushing end of the shank.

19. A sway bar linkage assembly comprising:
a socket joint comprising a housing and a ball stud disposed within and extending from the housing;
a shank extending between a socket joint end rigidly attached to the socket joint and a bushing end spaced apart from the socket joint end, the shank comprising a first bore extending between the bushing end and the socket joint end, and a second bore extending between the first bore and the socket joint end, wherein the first bore has a first diameter, and the second bore has inner threads and a second diameter less than the first diameter such that a flange extends between the first bore and the second bore;

a bolt comprising a head, a shaft extending from the head and a stud extending from shaft, wherein the shaft has a first diameter and the stud has an outer threads complimentary with the inner threads of the second bore and a second diameter less than the first diameter such that a ledge extends between the shaft and the stud; and a first bushing and a second bushing disposed on the bolt, the first bushing positioned proximal to the head of the bolt and the second bushing positioned between the first bushing and the socket joint, wherein a length of the shaft of the bolt, a length of the first bushing, and a length of the second bushing are configured to compress the first bushing and the second bushing a predefined amount between the head of the bolt and the bushing end of the shank when a sway bar end with a predefined thickness is disposed on the bolt between the first bushing and the second bushing and the stud threadingly engages the second bore such that the ledge of the bolt abuts against the flange of the shank.

20. The sway bar linkage assembly according to claim 19, wherein the flange extends between the first bore and the second bore at a ledge angle between about 45° and about 90° relative to a bore axis, and the ledge extends between the shaft and the stud at a ledge angle complimentary to the ledge angle.

\* \* \* \* \*